April 25, 1933.　　　T. R. POTTER　　　1,905,303
TABLE FOOTBALL GAME
Filed Feb. 13, 1929　　　2 Sheets-Sheet 1

Inventor
Thomas R. Potter
by Hazard and Miller
Attorneys

April 25, 1933. T. R. POTTER 1,905,303
TABLE FOOTBALL GAME
Filed Feb. 13, 1929 2 Sheets-Sheet 2
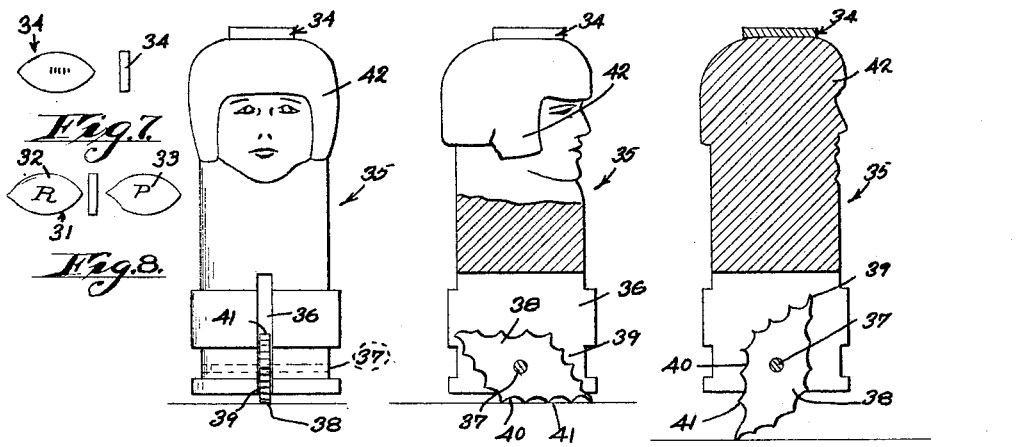
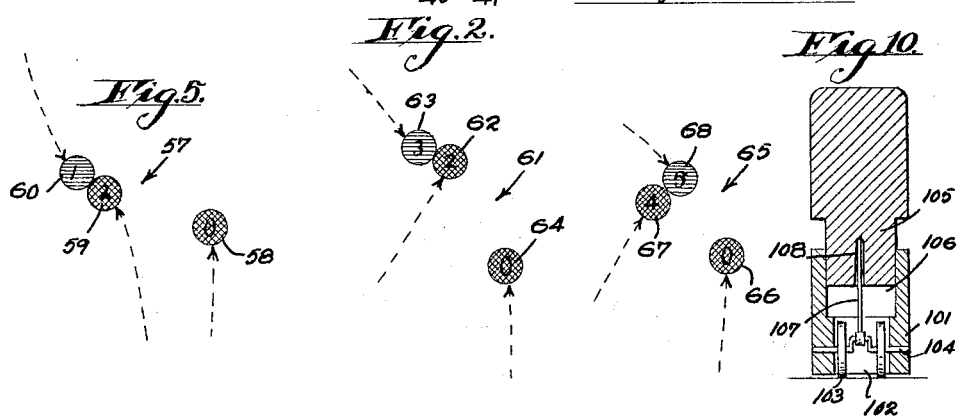
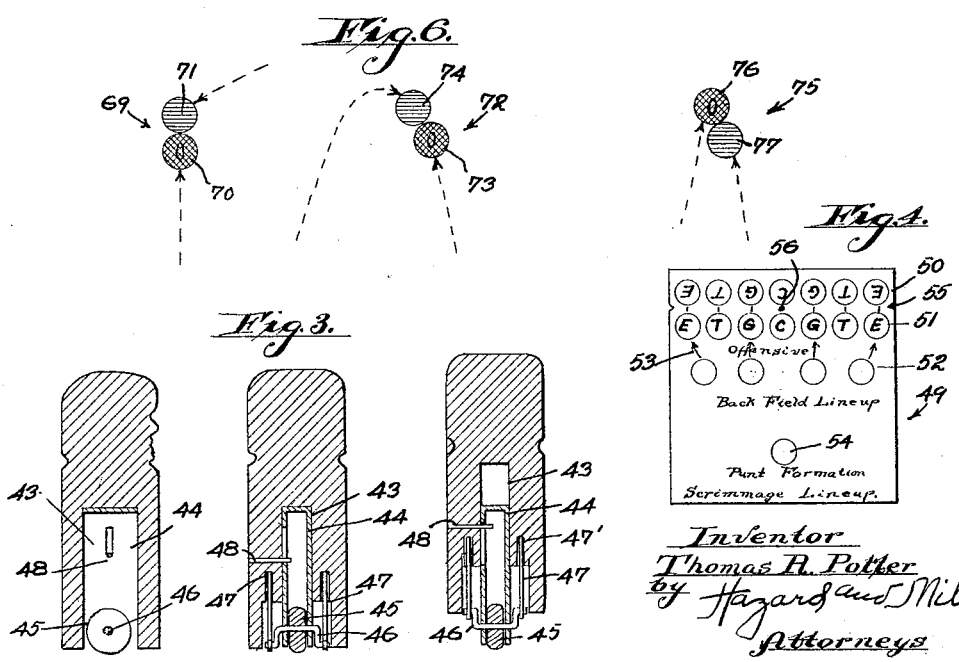
Inventor
Thomas R. Potter
by Hazard and Miller
Attorneys Patented Apr. 25, 1933

1,905,303

UNITED STATES PATENT OFFICE

THOMAS R. POTTER, OF LOS ANGELES, CALIFORNIA

TABLE FOOTBALL GAME

Application filed February 13, 1929. Serial No. 339,577.

My invention is a table football game in which a field board laid out as a football gridiron is utilized in which to play the game. The gridiron is marked off in yardage similar to a football field and the game is played with moving pawns or playing pieces on the board.

An object of my invention is a game of skill with a certain amount of chance in which the opposing players have pawns constituting the different teams. These pawns may be moved on the board and are presumed to be moved only in a forward direction and in the movement the pawns take what I term strides, that is, they have a slight rising movement for each unit of distance travel and I set arbitrary rules that a pawn can only advance five strides at a move.

Another object of my invention is having the pawns arranged so that their strides are of different length to represent slow and fast runners, whereby a fast runner in the five strides will cover more ground than the slow runner in the five strides, this being due to the different length of each stride.

A further object of my invention is on the field board having a scale device extending crosswise marked off in yardage and which is utilized by the opposing players to register the length of passes, kicks and punts. A flat disc-like device of the shape of a football is placed by a player on what may be termed the kicking or passing line and is then flicked by the finger on to the scale giving the yardage and where this stops shows the distance that a pass or a kick is presumed to carry.

Another object of my invention is utilizing in connection with the field board and the pawns, what I term a scrimmage board, this being a small board which may be shifted into different positions on the field board. The scrimmage board has markings thereon indicating the positions of the back field pawns and the forward line and showing certain positions for offensive and for defensive positioning of the pawns.

Another object of my invention is to develop what may be termed a guessing contest between opposing players, in that on the margins of the field board I have a series of numbers and letters, the numbers indicating what particular pawn is to carry the ball, the pawns being numbered and the letters indicating the particular plays. In this connection I utilize what I term a scale ball which may be placed by a player having the initial play on the indicia side of the board which I term the coaching bench and this simulates a call signal given by a coach to his team. The coaching bench with the indicia is covered by the player so that his opponent cannot see what the play is to be. The first player positions the scrimmage board at the desired place on the field, this position being in the initial stages of the games determined by the kick as represented on the scale.

The player having the offensive, positions his pawns on the scrimmage board, this having been located in the proper position on the field such player having first indicated his play but concealed the play from his opponent by a covering hood. The opposing player then positions his pawns to oppose the play but in this he has in effect to outguess the first player as his pawns may be placed in a good position to block the play or may be in a position totally inadequate to stop the pawns of the first player. It is not necessary to utilize the full team and I usually dispense with the forward line and regard these as being imaginary, using principally the back field pawns.

I have devised rules for tackling and blocking in which a pawn to effect a tackle must approach the pawn carrying the ball from the front of such latter pawn and to indicate which pawn carries the ball the device simulating the ball is placed on the head of such pawn. For blocking, the pawn of a team must come between an opposing pawn and the pawn of his own team which carries the ball. The feature of having the different pawns take different length strides makes these features simulate regular football plays.

A further and general object of my invention is a game simulating football which may be utilized to tactically work out different football plays and in which when the players become skilled they may dispense with the scrimmage board and place the pawns representing the opposing teams in a suitable lineup as if an actual game were being played. In some cases it is necessary for the opposing players in a play to move substantially all their pawns; in another case it may only be necessary to move the pawn carrying the ball and the opponent to move the pawns which are to oppose such player. I have arranged arbitrary rules that a player advances all the pawns he wishes to either the five paces or less than five and then the opposing player moves all or any number of his pawns five or less than five paces.

My invention is illustrated in connection with the following drawings, in which;

Fig. 3 is a series of vertical sections of an alternative form of pawn;

Fig. 4 is a scrimmage board;

Fig. 5 represents a series of different blocks;

Fig. 6 represents a series of different tackles;

Fig. 7 is a plan and edge view of the football;

Fig. 8 shows reverse sides and an edge view of the scale ball;

Fig. 9 is a cross section on the line 9—9 of Fig. 1 through the hood covering the indicia on the coaches bench.

Fig. 10 is a vertical section through a modified form of pawn.

Figures 1, 2:
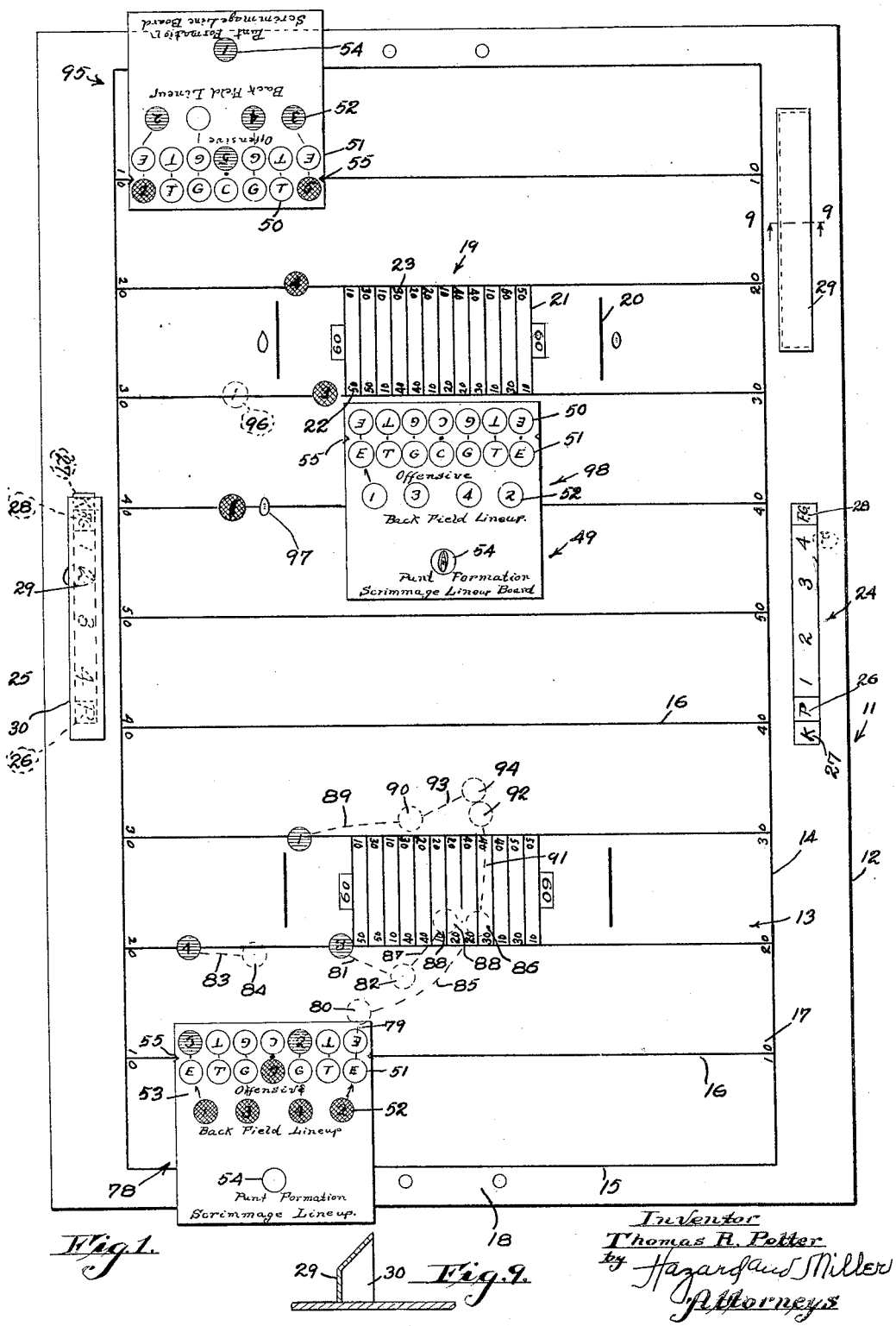
Figure 1 shows the field board with the scrimmage board thereon in various positions and illustrating different plays as well as showing the coaches bench with the indicia.
Fig. 2 is a front and side elevation partly in section and a vertical section through one of the pawns.

Referring first to Fig. 1, the field board is designated generally by the numeral 11. This has an outside border 12, which may be the outside of the board, and in this the gridiron designated generally by the numeral 13 is ruled off. The gridiron has side lines 14, ends 15 and a series of yardage lines 16. These yardage lines have indicia 17 at the side indicating the yardage from each end, this being 10, 20, 30, 40 and 50, the 50 yard line being at the center of the field. The goals 18 are indicated at each end of the field by dots on the field board.

There are two kicking or passing scales 19. These are placed transversely of the field board and have opposite punting or kick off lines 20 and a series of rulings 21. It will be noted that the column on one side as at 22 has the numbers readable from one side of the field, whereas the numbers 23 on the opposite side may be read from the other side of the field. These numbers are arranged in an irregular manner.

On the margins of the gridiron there are series of indicia 24 designated the coaches' benches. These have a series of numbers 1, 2, 3 and 4 which indicate the pawn to carry the ball or to execute a certain play. P designates a pass, K designates a kick, FG designates a field goal. These indicia may be enclosed by a hood 29 (shown in plan in Fig. 1 and in section in Fig. 9). This hood has an open side 30 so that a player sitting on one side of the field board may place the scale ball on the play he wishes to make and cover the indicia 24 with the hood, thus preventing his opponent from seeing his proposed play.

The scale ball is indicated in Fig. 8 and designated 31. This has the indicium R on one side representing a run and on the other side indicium P representing a pass. The football designated by the numeral 34 is illustrated in Fig. 7 and is represented by a flat piece of material colored to represent a football and this may be carried on the head of the pawn as illustrated in Fig. 2.

The pawns 35 as shown in Fig. 2, are preferably made from solid blocks preferably of wood and have a split 36 extending upwardly from the bottom. A pivot pin 37 extends across the slot and a wheel 38 is mounted on this pin. This wheel has a pair of opposite relatively sharp points 39 at diametrically opposite corners, and the sides connecting these corners are corrugated as indicated at 40. The wheel thus has four somewhat flat sides 41 with these corrugations which are adapted to rest on the field board and when the pawn is moved in a forward direction the wheel turns on the points 39 thus elevating the pawn and indicating a stride. Each elevation of the pawn caused by the engagement of the diametrically opposite points 39 thus represents a full stride. These wheels on different pawns are made of different sizes so that the pawns will have different lengths of strides. The pawn number 1 has the longest stride, the strides being graduated in pawns 2, 3, 4 and 5, 5 being the shortest. The pawn 1 in five strides travels about twice the distance of pawn number 5. The heads of the pawns are molded or carved to simulate a person's head with a headguard. The head is flat so as to carry the ball 34.

In Fig. 3 I show an alternative construction in which the pawn has a socket 43 in which operates a slide carriage 44 having a wheel 45 journaled therein. This wheel has a crank 46 and crank rods 47 extend upwardly, being journaled in the body of the pawn as indicated at 47′. A pin and slot construction 48 retains the carriage in the socket. With this construction as the pawn is moved forward the wheel 45 rotates, causing a rotation of the crank 46 which is keyed thereto and the crank gives a rising movement to the crank rods, thus causing a raising and lowering of the body of the pawn in reference to the carriage; thus indicating each stride. The wheels of the different pawns are made of different diameters so that they travel different distances for each stride.

In Fig. 4 I illustrate a scrimmage board designated generally by the numeral 49. This is a rectangular piece of suitable material having a series of circles thereon. The line 50 is intended for the positioning of the forward line of pawns in defensive plays. The positions are indicated by the letter C designating the center, G the guards, T the tackles and E the ends. The second line of circles 51 representing the position of the forward line when a team is playing on the offensive, that is when they have the ball in their possession. The third line 52 represents a back field lineup showing the position of four of the pawns playing the back field on an offensive play. The arrows 53 show the usual line of movement which the back pawns would take in a running game. The position 54 on the scrimmage board indicates a position for one of the pawns in a punting play, such back pawn is presumed to punt from such position.

Notches 55 at opposite sides of the scrimmage board are to indicate the line on which the board is to be placed when the ball is brought to rest on the field as by a down in a tackle and from which point another plays starts. The dot 56 in the center indicates the position of the ball in a scrimmage.

The various blocks or blocking plays are illustrated in Fig. 5, in which the diagram 57 illustrates a good block, the pawn 58 on one side carrying the ball and the pawn 59 of the same side blocking the pawn 60 of the opposite side. In diagram 61 the pawn 62 of one side blocks the pawn 63 of the opposite side from attacking the pawn 64 carrying the ball. Diagram 65 illustrates an ineffective block in which the pawn 66 carrying the ball and the pawn 67 are on the same side. This latter pawn is endeavoring to block the pawn 68 of the opposing team however, as the pawn 68 bearing numeral 5 is slower than the pawn 67 bearing the numeral 4, 68 is sufficiently clear of 67 so that the block is considered ineffective.

In Fig. 6 I illustrate various tackles. The diagram 69 shows a pawn 70 carrying a ball and running toward an objective in the direction of the arrow, who is tackled by the pawn 71 on the opposing side coming between the pawn 70 and its objective and into contact with such pawn. Diagram 72 shows a pawn 73 carrying the ball and another pawn 74 of the opposing team. This pawn 74 is indicated as being a fast runner and overtakes pawn 73 coming around in front of such pawn and making a tackle to prevent such pawn following to his objective. The tackles of diagrams 69 and 72 are deemed good tackles. The diagram 75 indicates a bad or ineffective tackle in which the pawn 76 having the ball is presumed to be overtaken by the pawn 77 of the opposing team, both running in the same direction but as the number of strides a pawn can take is limited to five by the rules of the game, catching up with a pawn carrying a ball is not deemed an effective tackle if done in accordance with the diagram 75 but it is an effective tackle if done in the manner shown in the diagram 72.

I prefer to allow each team to have five pawns varying in number from 1 to 5, in which as above mentioned 1 is the fastest runner and 5 the slowest and when a team is on the offensive number 5 occupies the center position C on the line 51 for the forward line of the offense; pawns 1, 2, 3 and 4 occupy the back line 52 and may be designated as right and left halves, quarter-back and full-back. This would be a position for a scrimmage. The opposing team is allowed to have two pawns on their forward line 50 and these may be placed in any of the seven positions on the line. Two of the other pawns must be at least 10 yards back of the position of the ball which is designated at 56 on the scrimmage board and the safety back at least 20 yards from the position of the ball. When a player calls a play by putting the scale ball on one of the indicia 24, this being under cover, his opponent has to guess what this play will probably be and place his pawns on the forward line of the defense and the back line of the defense as he sees fit. If the player on the offensive indicates a punt, he must move one of his pawns from the back line 52 to the punt position 54. When a running play is indicated, that is, a pawn carrying the ball, the player on the offensive places the ball 34 on the head of the pawn which he indicates is to carry out the play and as above mentioned this pawn must advance in the direction of the arrows 53 until such player is free of the scrimmage board and then the pawn may take any direction that the player designates. A player may advance his pawn five strides or less but not more than five according to arbitrary rules of the game.

When the player on the defensive has completed the placing of his pawns after the offense player has made his election of play, the hood 29 is removed so that the defense player may see that the offense player is following the play which he has indicated by placing of the scale ball 31. In order to indicate a pass or a kick the position at which the scale ball 31 comes to rest on the scale 19 is taken to indicate the yardage of the kick or pass and to make this more accurate the yardage is indicated by the point on one side of this scale ball so that if the scale ball overlaps one of the yardage lines, there can be no dispute as to the position of the pointer on the scale ball.

A few typical plays are indicated in Fig. 1, referring first to the scrimmage board position indicated at 78. This is a play in which the team at the bottom of the board is on the offensive and the ball is considered to be on the 10 yard line. The offense player has the pawns indicated by the black hatching which may be designated as the black team and the pawns 1, 3, 4 and 2 are arranged on the back field position line 52.

The pawn 5 of the black team is placed on the center position for an offensive play. The pawn is indicated by the scale ball on the indicia 24 at the left hand side, this being number 2, showing that pawn number 2 is to carry the ball and execute the play. This so-called coach's bench with the indicia 24 is covered by the hood 29. Therefore this proposed play is obscured to the rival player. Such rival player is on the defensive, places his pawns, two of which are located on his forward line 50 of the scale ball. This team is the blue team having the blue hatching and of these he has placed pawn 5 on one of the end spaces and pawn 2 as a guard, pawns 3 and 4 he has placed on the 20 yard line and the pawn 1 on the 30 yard line.

The player having the offense then removes the hood so that his rival may see what the play is and the football 34 is placed on the head of the black pawn 2. I establish arbitrary rules that if the ball and the field are left open so that an offensive player may execute the designated play, the offense has the first move; but if the defense player has guessed the play correctly and placed his pawns to block this play, then the defense has the first move. In this case however, the black pawn 2 can follow the line 53 on the scale board and advances as indicated by the dotted line 79 to the position 80. There is no necessity for any of the other pawns on the black team moving as the play may be considered as carried on solely by the black pawn 2.

This black pawn being a fast runner is illustrated as traveling approximately 10 yards in the five strides. The player having the blue team moves pawn 3 in the dotted line 81 to the position 82 taking five strides and he moves pawn 4 on the dotted line 83 to the position 84. By arbitrary rules he does not move his pawn 1 until the pawn carrying the ball has advanced beyond his forward pawns 3 and 4.

In the next play by the black team, the black pawn 2 can either pass to the right or to the left of the blue pawn at the position 82 but if he passes to the left he will have to pass between the blue pawns 3 and 4 which occupy the positions 82 and 84. Therefore the black pawn 2 is run in the curved path 85 to the position 86, this ending the play of the offensive.

The defensive blue team then shifts pawn 3 from position 82 five paces following the dotted line 87 to the position 88 but has been unable to catch or tackle the black pawn 2 at position 86. The blue team then shifts pawn 1 by the dotted line 89 five paces to the position 90, this being approximately 10 yards. There is no necessity of the defense player moving pawn 4 at the position 84 because he is absolutely out of the immediate play. The next move of the offense moves black pawn 2 from the position 86 following the dotted line 91 to the position 92, this being 5 paces. The blue pawn 1 is then moved following the dotted line 93 to the position 94 and makes a good tackle of the black pawn 2 who is at the position 92. This it will be seen makes a gain for the black team from the 10 yard line to approximately the 32 yard line and for the next scrimmage the scrimmage board is advanced placing the position 56 for the ball on the position 92 where the black pawn 2 was successfully tackled. Other plays may then be executed.

The scrimmage board in the position 95 at the top of the field illustrates another type of play, this being a pass and in this case it is presumed that the blue team are on the offensive and the black on the defensive and that the ball is located in the 10 yard line. The blue team on the offense has arranged the pawn 1 on the punting position 54 and pawns 3, 4 and 2 on the back line positions 52 with the pawn 5 on the center position of the line 51. The offense blue team then indicated on the coach's bench at the indicia 24 on the right hand side of the field, his play and which player is to execute this, putting the hood 29 over the indicia 24. He does this by placing the scale ball 31 on the indicia 1 with the letter P up indicated a pass and that number 1 is to receive the pass. The defense player of the black team then places his pawns. The diagram shows that he has placed numbers 2 and 5 on his forward lines in the end positions, number 4 is on the 20 yard line, number 3 on the 30 and number 1 on the 40 yard line. The offense player then removes the hood and states the number of yards he is making a pass.

It is presumed he has indicated a 20 yard pass and shifts the blue pawn 1 to the position 96. A blue player then places the scale ball on the line 20 of the scale 19 and with his finger flicks this across the scale endeavoring to have the scale ball stop with the pointer on a space indicating 20. It is presumed that instead of this landing on the space 20 that the scale ball stops on the space 30, the ball being presumed to land on the position 97. It is presumed then that the black team secures the ball presumably by the pawn 1 and that this pawn 1 is successfully tackled by the blue pawn 1; this ending the play with the black team having the ball. A scrimmage is then started, positioning the scrimmage board with the ball at the position 97, the offensive being with the black team.

In the position of the scrimmage board 98 I illustrate a play where the black team on the offensive endeavors to make a field goal and the player handling the black team places the scale ball on the scale 24 over the letters FG. The scale ball is then flicked from the line 20 of the scale 19 convenient to the player having the black team and this may be the scale at either end of the field board and if he makes sufficient yardage by this flick it is considered that he has made a field goal.

The above description shows several plays in which the scrimmage board is used, but it is quite obvious that this scrimmage board may be used in connection with other types of play developing in football and with this scrimmage board the players may have a full team or not as they desire. In such case however, the pawns forming the line would be considered as having the same speed as the pawn number 5, that is they would be the slowest players. When players become skilled in the game they may dispense with the scrimmage board and place their pawns on the field board in any suitable formation that may be played in regular football and these pawns may be shifted through various maneuvers much in the same manner as would be done by actual players.

In Fig. 10 I show a modified form of pawn. This pawn has a base 101 with a socket 102 therein. A pair of wheels 103 have a crank axle 104. The upper section 105 of the pawn fits in a recess 106 of the lower section and a crank rod 107 fits in a socket 108 in the upper section and connects to the crank. In the movement of this pawn over the field board the rotation of the wheels causes a rotation of the crank and the crank through the medium of the crank rod 107 causes an up and down movement of the upper part of the pawn. The operator may grasp the base which does not rise or drop and by observing the movement of the top can count the number of paces.

Various changes may be made in the principles of my invention without departing from the spirit thereof as set forth in the description, drawings and claims.

I claim:

1. A game comprising in combination a field board with suitable markings indicating distance, a series of pawns, each pawn having a rotatable element engaging the field board, such element in rotation causing a movement of the pawn indicating to the player a stride or series of strides of the pawn.

2. A game comprising in combination a field board having suitable markings indicating distance, a series of pawns, each pawn having an element engaging the field board, such element moving on the forward movement of the pawn and causing a rising and lowering of the body of the pawn, thereby indicating to the player a stride or series of strides of the said pawn.

3. A game comprising in combination a field board having suitable marking indicating distance, a plurality of pawns, each having an element engaging the field board, such element in the movement of a pawn over the field board causing indication to the player of a stride or strides of a pawn, a series of the pawns having strides of different lengths.

4. A game comprising in combination a field board having markings to simulate a football field, a shiftable board movable to various positions on the field board where a play may take place, a series of markings on the shiftable board to locate pawns, said markings representing positions similar to those taken by players in football, and a series of pawns having means to indicate different relative distances of movement of such pawns on the field board.

5. A game comprising in combination a field board having rulings thereon simulating the marking lines on a football field, a series of indicia on the board to indicate different football players or plays to be executed by a team, obscuring means for said indicia, and a plurality of movable pawns adapted to be shifted to different positions on the field board in accordance with such indicia.

6. A game comprising in combination a field board having rulings simulating the lines marked on a football field, a series of indicia on the margin to indicate football players or different plays to be executed, obscuring means for said indicia, a scale giving a series of various distances, a device to flick over such scale and a series of pawns shiftable on the board in accordance with such indicia.

7. A game as claimed in claim 6, a shiftable board adapted to be moved to various positions on the field board, such shiftable board having markings indicating positions to place the pawns, such positions simulating positions occupied by football players in a game of football said pawns being removable from the board in executing the play.

8. A game comprising in combination a field board having rulings thereon simulating the lines of a football field, a series of indicia on the margin indicating a football player or plays to be executed, a series of pawns having indicia thereon to distinguish different pawns one from another, each pawn having a device engaging the field board and indicating to the operator a stride or series of strides when the pawn is shifted over the field board.

9. A game comprising in combination a field board having markings and ruled lines to simulate the markings and lines of a football field, a plurality of indicia on the board with means to indicate various plays, a shiftable board adapted to be moved to different positions on the field board, said shiftable board having a series of markings to indicate positioning of pawns, a plurality of pawns each having means engaging the field board when the pawn is shifted and indicating to the operator a stride or series of strides of a player.

10. In a game, a field board having rulings and markings simulating the lines marked on a football field and the goal posts, a series of indicia on the board to indicate various plays, and obscuring means for said indicia, a scale on the board marked off in different distances, and means to flick across said scale to indicate the distance of movement in a play from one position on the field board to another.

11. In a game, a field board having yardage markings from each end to simulate the markings on a football field and between certain of said markings and extending transversely of the field, the construction of a scale having lines and indicia indicating distance and another line indicating a punting or kickoff line, in combination with a device to be flicked from the punting or kickoff line across the said scale.

12. In a game, the combination of a field board having markings thereon to indicate distance, a plurality of pawns, each pawn having means to engage the field board and to communicate a vertical movement to the pawn in a movement of translation over said field board, the said movement indicating strides and, therefore, the distance covered by such pawn.

13. In a game, the combination of a field board having markings indicating distance, a plurality of pawns each having means to engage the field board and in a movement of translation over such board to give a portion of the pawn an up and down movement in reference to the board to indicate strides, the said means engaging the boards giving different length strides to different pawns whereby said pawns travel different distances in the same number of strides.

14. In a game, the combination of a field board having markings indicating distance, a plurality of pawns each having means engaging the field board and in a movement of translation thereover communicating an up and down motion to a portion of the pawn and thereby indicating strides, each of said board engaging means giving a different length stride, and indicia on each of the pawns to show different distances which may be traveled in the same number of strides.

15. In a game, the combination of a field board having markings indicating distance, a pawn having a means interengaging with the field board and in a movement of translation over the board communicating an up and down movement to part of the pawn and thereby indicating a stride, a certain number of strides representing a certain distance traveled, and the said pawns having means to carry a representation of a ball.

16. In a game, a pawn having a recess in the bottom, a wheel like structure rotatably mounted therein, said wheel structure having a projecting sharpened point adapted to engage a board when the pawn is moved thereover and communicate an up and down movement to a portion of the pawn on such movement of translation and rotation of the wheel and thereby indicating a stride.

17. In a game, a pawn having a recess in the bottom and having a rotatably mounted wheel therein, said wheel having a pair of projecting sharpened points adapted to engage a board when the pawn is moved thereover in a movement of translation and give the pawn two up and down movements to each rotation of the wheel and thereby indicate different strides.

18. In a game, the combination of a field board having markings thereon indicating distance, a plurality of pawns, indicia on the board to indicate different pawns or plays to be executed, and means to obscure said indicia from an opponent.

19. In a game as claimed in claim 18, the field board having a scale thereon indicating distances a ball may be kicked or thrown, and a device adapted to be moved over said scale to indicate the distance of advance of plays executed by the pawns.

20. In a game, the combination of a field board having markings indicating distance on the field of play from end to end, a transverse scale on the board having distances marked thereon which a ball may be kicked or thrown, a representation of a ball, a device to move over the said scale and thereby indicate the distance the representation of the ball is to be advanced on the field board.

21. In a game, a pawn having a base, an upper section slidably mounted thereon, a wheel mounted in the base engaging a game board, and means operatively connected between the wheel and the upper part to shift the upper part up and down as the base part is moved over a board, the bottom of the base and the wheel supporting a pawn substantially upright on the game board.

22. In a game, a pawn having a base with a recess, an upper part slidably mounted in said recess, an axle connected to the lower part with a wheel projecting slightly below the bottom of the base and having a crank connected to the heel and a crank rod connecting the crank and the upper part to move the upper part up and down on a movement of translation of the lower part in rolling a wheel over a board, the bottom of the base and the wheel supporting the pawn substantially upright on a plane surface.

In testimony whereof I have signed my name to this specification.

T. R. POTTER.